United States Patent [19]

Olsen et al.

[11] Patent Number: 5,266,035
[45] Date of Patent: Nov. 30, 1993

[54] LUNG PAIR PHANTOM

[75] Inventors: Peter C. Olsen, West Richland; N. Ross Gordon; Kevin L. Simmons, both of Kennewick, all of Wash.

[73] Assignee: Battelle Memorial Institute, Richland, Wash.

[21] Appl. No.: 29,738

[22] Filed: Mar. 11, 1993

[51] Int. Cl.$^5$ .............................................. G09B 23/28
[52] U.S. Cl. ...................................... 434/272; 434/267
[58] Field of Search ................. 434/267, 262, 272, 265

[56] References Cited

U.S. PATENT DOCUMENTS 4,164,526  8/1979  Clay et al. ........................... 264/45.3

FOREIGN PATENT DOCUMENTS 0855722  8/1981  U.S.S.R. ............................... 434/262

OTHER PUBLICATIONS

"Applied X-ray" (Textbook), Clark QC/481/C47, 1955, 4th Ed., p. 176.
"Science News Letter", Jul. 23, 1949, p. 53.
D. R. White, Phantoms and Computational Models in Therapy, Diagnosis & Protection, ICRU News, Jun. 1991.
R. V. Griffith, et al., Fabrication of a Tissue—Equivalent Torso Phantom . . . Intercalibration . . . Preprint UCRL-80343, Apr. 3, 1978.
R. V. Griffith, unpublished letter to H. E. Palmer, Jun. 3, 1980.
K. L. Swinth, Tabulation of Photon Interaction Coefficients for International Atomic Energy Agency Intercomparison Tissue Substitutes, 8 pages.

Primary Examiner—Gene Mancene
Assistant Examiner—Jeffrey A. Smith
Attorney, Agent, or Firm—Paul W. Zimmerman

[57] ABSTRACT

The present invention is a material and method of making the material that exhibits improved radiation attenuation simulation of real lungs, i.e., an "authentic lung tissue" or ALT phantom.

Specifically, the ALT phantom is a two-part polyurethane medium density foam mixed with calcium carbonate, potassium carbonate if needed for K-40 background, lanthanum nitrate, acetone, and a nitrate or chloride form of a radionuclide. This formulation is found to closely match chemical composition and linear attenuation of real lungs.

The ALT phantom material is made according to established procedures but without adding foaming agents or preparing thixotropic concentrate and with a modification for ensuring uniformity of density of the ALT phantom that is necessary for accurate simulation. The modification is that the polyurethane chemicals are mixed at a low temperature prior to pouring the polyurethane mixture into the mold.

16 Claims, No Drawings

LUNG PAIR PHANTOM

This invention was made with Government support under Contract DE-AC06-76RLO 1830 awarded by the U.S. Department of Energy. The Government has certain rights in the invention.

FIELD OF THE INVENTION

The present invention relates generally to a phantom and method of making the phantom for measuring radiation dose received into lungs and more specifically to a material that exhibits improved simulation of real lungs. The phantom of the present invention is herein referred to as the "authentic lung tissue" or ALT phantom.

BACKGROUND OF THE INVENTION

Phantoms, composed of tissue substitutes, are used as a proxy for real subjects by scientists, health physicists, and physicians to study how ionizing radiation material, especially gamma-emitting radionuclides, is deposited within a subject (animal or human) exposed to ionizing radiation material. Primary functions of phantoms include dosimetry, calibration, and imaging. Within each functional category, primary types of phantoms include anthropomorphic (body), standard, and reference. It will be apparent to those skilled in the art of phantoms that the present invention is useful for any category, any type or combination thereof.

The fundamental shortcoming of any proxy is the uncertainty introduced by differences between the proxy and the real subject. For phantoms, it is desired to match (a) geometry, (b) radiation response properties of tissue, and (c) the interface between phantom and detector. Of these three criteria, the second, radiation response properties, is the most difficult to match and is the source of greatest uncertainty. Within the radiation response properties criteria, the main parameter scientists seek to match between phantoms and real subjects is the attenuation coefficients which are a function of the chemical composition, the effective atomic weight, and the density of the phantom material.

Proxys are used both for whole body modeling and for specific organ modeling; for example, the lung. Because the various organs have different shapes, sizes, and biological/chemical composition, individual organs respond differently to ionizing radiation material. Hence, their proxys are necessarily different. This invention is specifically directed toward a proxy or phantom for modeling physical response to ionizing radiation material deposited in a lung.

Lung phantoms have been developed and relied upon for many years. Generally readily available plastics, for example polyurethane, have been used as well as other low density materials. However, for more accurate modeling, specific formulations have been developed including Temex having a polymerized rubber, polyvinyl chloride (PVC) "polyfoam", and Rando having a rigid filled epoxy. Again, however, for measurements of ionizing radiation having energies as low as 15 keV exposing tissues of thickness greater than 4 cm, yet different phantom formulations were needed.

At the Symposium on Advances in Radiation Protection Monitoring, Stockholm, Sweden, Jun. 26-30, 1978, authors RV Griffith et al., presented FABRICATION OF A TISSUE-EQUIVALENT TORSO PHANTOM FOR INTERCALIBRATION OF IN-VIVO TRANSURANIC-NUCLIDE COUNTING FACILITIES, described a phantom constructed of a rib cage, chest plates, and various removable organs including lungs, heart, liver, kidneys, spleen, and tracheo-bronchial lymph nodes. Polyurethane with different concentrations of calcium carbonate was used to simulate the linear photon attenuation properties of human tissues of lean muscle, adipose muscle mixtures, and cartilage.

These phantom elements are prepared for calibration measurements by incorporating highly pure $^{238}$Pu, $^{239}$Pu, and $^{241}$Am, for simulating uniform deposition of ionizing radiation. In particular, the lung phantom material consisted of a mixture of (a) a two-component polyurethane, 1940D (black), obtained from CPR Division of Upjohn Corporation, but no longer available. The 1940D was a castable isocyanate polyurethane requiring addition of water for foaming. The Griffith et al. lung phantom was specifically 30% by weight of component A of the polyurethane and 68.4% by weight of component B, (b) 0.15% by weight water to generate foaming, 0.15% by weight acetone with transuranic tracer, 6.2% calcium carbonate added to component A to obtain proper x-ray transmission, and lanthanum nitrate as a carrier for the transuranic nuclides tracer. However, results were not duplicable without a second catalyst, stannous octoate, used to give a workable reaction rate, and a heated mold for providing uniform density (unpublished letter Jun. 1980 from R. Griffith to H. E. Palmer).

The Griffith et al. phantom material is made by first mixing the calcium carbonate and component A of the polyurethane. Component B, water and stannous octoate, are added and the foaming reaction begins. The acetone and lanthanum nitrate containing the transuranic tracer are mixed and added to the polyurethane, making a total mixture. The total mixture poured is into a mold. Final density is controlled by the amount of total mixture poured into the mold, and uniformity of density is controlled by preheating the mold to a predetermined temperature.

The calcium carbonate powder has a tendency to settle in the liquid foam. In order to suspend the calcium carbonate in the liquid foam, a thixotropic concentrate is prepared prior to the foaming process. The thixotropic concentrate is prepared by first mixing component B and calcium carbonate in a relative proportion of about 2:1, then passing the mixture through a three roll paint mill. Any excess moisture remaining from the milling is removed by heating the milled mixture to 120° F. under vacuum.

It is necessary to mix and pour within about 30 sec because the foaming reaction begins as soon as parts A and B of the polyurethane are mixed, and the stannous octoate catalyst increases the reaction rate so that if the mixture is not poured within about 30 sec of mixing, then the amount of foaming renders the mixture un-pourable.

While this lung-phantom closely matched two actual lung parameters, 3869 cm$^3$ phantom compared to 3915 cm$^3$ reference man, and density, 0.28 g/cm$^3$ phantom compared to 0.31 g/cm$^3$ lung tissue (Griffith et al., Table III), it is neither shown how this lung phantom material compares to chemical composition of a real lung, nor shown what attenuation coefficients result from a range of radiation energies.

Further, as reported in the ICRL82655 Preprint, Polyurethane as a Base For a Family of Tissue Equivalent Materials, R. Griffith, 5th International Congress of IRPA, Jerusalem, Israel, 14 Mar. 1980, the 17.2 keV linear attenuation coefficient of the Griffith et al. lung phantom is 0.272 cm$^{-1}$, while the ICRU 46 lung linear attenuation coefficient at 17.2 keV is 0.312 cm$^{-1}$.

The ICRU 46 lung is specified as having a chemical composition of 10.5 weight percent carbon, 10.3 weight percent hydrogen, 3.1 weight percent nitrogen, 74.9 weight percent oxygen, plus trace amounts of phosphorus, sodium, sulphur, chlorine, and potassium, totalling to 1.2 weight percent.

It would be advantageous to identify a lung phantom that can be made from materials presently available, and that more closely matches geometry, density, linear attenuation and chemical composition of actual lung material.

SUMMARY OF THE INVENTION

The present invention is a material and method of making the material that exhibits improved radiation attenuation simulation of real lungs, i.e., an "authentic lung tissue" or ALT phantom.

Specifically, the ALT phantom is a two-part polyurethane medium density foam mixed with calcium carbonate, potassium carbonate if needed for K-40 background, lanthanum nitrate, acetone, and a nitrate or chloride form of a radionuclide. This formulation requires no additional water beyond that present in aqueous lanthanum nitrate for foaming, does not require removing moisture from the polyol/calcium carbonate concentrate, and does not require the concentrate to be thixotropic.

The ALT phantom material is made according to the procedure described herein under Background of the Invention, but preferably without the steps not required as recited above and with a modification for ensuring uniformity of density of the ALT phantom that is necessary for accurate simulation. The modification is that the polyurethane chemicals are mixed at a low temperature prior to pouring the polyurethane mixture into the mold, the mold is preheated to a temperature that is effective to make a uniform density casting by controlling the rate of foam expansion.

The subject matter of the present invention is particularly pointed out and distinctly claimed in the concluding portion of this specification. However, both the organization and method of operation, together with further advantages and objects thereof, may best be understood by reference to the following description.

DESCRIPTION OF THE PREFERRED EMBODIMENT(S)

The present invention is a material that exhibits improved simulation of real lungs. First, the characteristics of "authentic lung tissues" must be selected. The characteristics selected are based upon the ICRU (International Commission on Radiation Units and Measurements) 46 lung composition as described in ICRU report 46, PHOTON, PROTON, ELECTRON AND NEUTRON INTERACTION DATA FOR BODY TISSUES. Attenuation coefficients for the ICRU 46 lung are obtained from the XCOM computer code developed by Savannah River for the U.S. Department of Energy, as reported by Berger and Hubbel 1987, Photon Cross Sections On a Personal Computer, Report No. NBSIR87-3597 U.S. Government Printing Office, Washington, D.C.

Significantly, ICRU 46 tissue substitutes specifies density for an inflated lung of 0.26 to 0.28 g/cm$^3$ which is somewhat less than the lung tissue density standard of 0.31 g/cm$^3$ relied upon by Griffith et al.

Specifically, the ALT phantom is a two-part polyurethane low density foam mixed with calcium carbonate, potassium carbonate if needed for K-40 background, lanthanum nitrate, acetone, and a nitrate or chloride form of a radionuclide. The polyurethane is an isocyanate catalyst polyurethane (ICP). Specifically the ICP, having 4-4-diphenylmethane-diisocyanate and obtainable from FOAMEX in Torrance, Calif., product number DS-218-18 is preferred. An ICP with 4-4-diphenylmethane-diisocyanate with a nominal density of about 18 lb/ft$^3$ (0.288 g/cm$^3$) provides a chemical composition exhibiting radiation attenuation coefficients closely simulating those of real lungs. It is preferred that the nominal density be about the same or somewhat greater than the desired final density of the ALT phantom, thereby permitting consistent foam quality in terms of cell structure.

The DS-218-18 is a two-part polyurethane having a first part of diisocyanate and a second part of polyol having nominal relative proportions by weight of about 50% diisocyanate and about 50% polyol. The polyol is a propylene glycol, preferably polypropylene glycol.

When preparing the ALT phantom, it is preferred to prepare a concentrate by mixing the calcium carbonate with the polyol because (a) thorough mixing is required to obtain a homogeneous suspension of calcium carbonate in the final foam, (b) calcium carbonate is hygroscopic, absorbing moisture from the atmosphere, said moisture reactive with the isocyanate, and (c) cleaning of mixing equipment is accomplished with common detergent rather than with methyl alcohol or acetone required if the calcium carbonate is mixed with the isocyanate. The DS-218-18 is particularly preferred because it is obtainable in quantities less than a 55 gallon drum.

The concentrate is prepared with relative proportions of polyol to calcium carbonate of from about 5:1 to about 6:1, and preferably about 5.7:1. The polyol is placed in a two-roll rolling mill and the calcium carbonate added as a powder sifted through a screen or mesh. The mesh size is preferably 10 mesh. Milling time is from about ½ hour to about ¾ hour, which is sufficient to break up any agglomerations of calcium carbonate and homogeneously mix the calcium carbonate particles throughout the polyol. During the milling, there is an accumulation of unmixed polyol between the rollers, known in the art as a "nip". It is necessary to stir the nip about every 10 minutes to obtain a homogeneous concentrate. After milling, the calcium carbonate may settle in the concentrate, but can be resuspended by stirring or shaking.

The concentrate is further mixed with additional polyol to obtain the proportions in the following table, showing a relative proportion of polyol to calcium carbonate of about 11.8:1.

| ALT Phantom Mixture Formulation Component Total Proportions (Percent by Weight) | | |
|---|---|---|
| ALT Phantom Component | Total Proportion Range | Preferred Total Proportion |
| diisocyanate | 46.34–48.24 | 47.29 |
| polyol | 46.34–48.24 | 47.29 |
| Calcium Carbonate | 3.9–4.1 | 4.0 |

-continued

| ALT Phantom Mixture Formulation Component Total Proportions (Percent by Weight) | | |
|---|---|---|
| ALT Phantom Component | Total Proportion Range | Preferred Total Proportion |
| Potassium Carbonate | 0.00–0.02 | 0.00–0.02 |
| Lanthanum Nitrate | 0.001–0.004 | 0.001 |
| Acetone | 0.8–1.8 | 1.1 |

The relative proportions between the diisocyanate and the polyol together with the total proportions of all ALT phantom components are important to achieve the proper density, and proper chemical composition to effectively mimic properties of density, z-number, electron density, and linear attenuation coefficients as a real lung. Chemical composition of the polyurethane is preferably carbon, hydrogen nitrogen, and oxygen in the proportions shown in the following table. Trace elements found in the polyurethane are included because they affect linear attenuation coefficients, especially at the lower energies.

| Chemical Composition of ALT Phantom | | |
|---|---|---|
| Error Element | Proportion Percent by Weight | Relative Error Percent by Weight |
| Carbon | 62.71 | 0.31 |
| Nitrogen | 3.04 | 0.30 |
| Hydrogen | 8.45 | 3.19 |
| Oxygen | 24.43 | 0.52 |
| Tin | 0.008 | — |
| Iron | 0.002 | — |
| Phosphorus | 0.31 | — |
| Chlorine | 0.82 | — |

A finished ALT phantom preferably has as a left lung of about 482 g and a right lung of about 577 g.

The ALT phantom material is made according to the procedure described herein under Background of the Invention but without (a) addition of water, and (b) removal of moisture from the concentrate, and with a modification for controlling overall density and ensuring uniformity of density of the ALT phantom that is necessary for accurate simulation. The modification is that the components are mixed at a low temperature. The low temperature retards the foaming reaction permitting sufficient time for thorough mixing and uniformly distributing the radionuclide throughout the mixture. Additionally, density uniformity is improved with the more thorough mixing of the two parts of the polyurethane. The lower temperature can be as low as just above the freezing temperature of the mixture and below a temperature where foaming begins quickly; for example, from about 20 sec to about 30 sec at a temperature from about 70° F. to about 77° F. A preferred mixing temperature is from about 50° F. to about 60° F., permitting mixing times of from about 2 minutes to about 3 minutes, thereby achieving greater homogeneity of calcium carbonate in the finished phantom.

Prior to pouring the polyurethane mixture into the mold, the mold is preheated to a temperature that is effective to make a uniform density casting by controlling the rate of foam expansion. Acceptable mold temperatures range from about 100° F. to about 120° F. maximum, with a preferred temperature of about 110° F.

EXAMPLE 1

Upon learning that polyurethane 1940-D was no longer available from Upjohn, Inc., a suitable substitute was sought. It was decided that it would be preferred to obtain a foam material rather than create a foam from a castable material. However, because a polyurethane foam has vastly different chemical composition and physical properties compared to real lung tissue, it was not possible to predict which, if any, substitute foam would produce a satisfactory lung phantom.

The primary selection criteria for a foam material were (a) the linear attenuation coefficient must closely match that of real lung tissue, and (b) the foam material must be uniform throughout its volume. Candidate foam materials should then exhibit (a) density of final foam closely matching that of real lung tissue, (b) chemical composition resulting in closely matching linear attenuation coefficients, (c) manually moldable, and (d) chemically compatible with additives of acids, carbonates, and radionuclides.

Three isocyanate catalyst polyurethane foams were obtained as identified in the following table.

| Candidate Polyurethanes |
|---|
| Polyurethane |
| DS-218-12 |
| DS-201 (black) |
| DS-218-18 |

Foam samples were made in flat sheets and attenuation of gamma photons through single layer sheet foam samples was measured.

The DS-218-12 having a nominal density of 12 lb/ft$^3$ (0.19 g/cm$^3$) was prepared with the addition of 6.2 weight percent calcium carbonate, lanthanum nitrate, and 5 mL of 0.5N nitric acid. For DS-218-12, the relative proportion of 4-4-diphenylmethyl-diisocyanate was 35 weight percent, while the relative proportion of polyol was 65 weight percent. In a first instance, the mold was at ambient temperature. Only a portion of the DS-218-12 foamed. In a second instance, the mold was preheated according to the present invention and complete foaming occurred, producing a final density of 0.271 g/cm$^3$. Subsequent measurement of linear attenuation coefficient using Am$^{241}$ photons having an energy of 59.5 keV gave 0.171 cm$^{-1}$ which was greater compared to the ICRU 46 lung standard of 0.054 cm$^{-1}$. Further analysis using XCOM confirmed that the DS-218-12 phantom exhibited linear attenuation coefficients greater than the ICRU 46 lung by as much as 70% as shown in the following table.

| Linear Attenuation Coefficient (cm$^{-1}$) From XCOM | | | |
|---|---|---|---|
| | Energy | | |
| Phantom | 17.2 keV | 20.2 keV | 59.5 keV |
| ICRU 46 lung | 0.312 | 0.211 | 0.054 |
| DS-218-12 | 0.438 | 0.360 | 0.065 |

Variations in type and concentrations of filler materials, including but not limited to $CaCO_3$, $Bi_2O_3$, FeO, $BaSO_4$, $Al_2O_3$, $TiO_2$, and combinations thereof were tried, but did not closely match the linear attenuation coefficient of real lung tissue.

The DS-201 (black) is a low density 4-4-diphenylmethane-diisocyanate made from relative proportions of 25 weight percent of the isocyanate and 75 weight percent polyol. The DS-201 exhibits a nominal density of from about 2.5 lb/ft$^3$ to about 3.0 lb/ft$^3$ (0.040–0.048 g/cm$^3$). Attempts were made to obtain the desired density by mold pressurization, but pressures in excess of the capacity of the available molds would have been necessary to obtain the desired density of about 0.26 g/cm$^3$.

The DS-218-18 foam material is made from relative proportions of 4-4-diphenylmethane-diisocyanate and ethylene glycol of 50 weight percent each, and exhibits a nominal density of 18 lb/ft$^3$ (0.288 g/cm$^3$). A sample of DS-218-18 foam was prepared having 4.0 weight percent calcium carbonate lanthanum nitrate, 5 mL of 1.0N nitric acid, and a density of 0.26 g/cm$^3$. The measured linear attenuation coefficient for Am$^{241}$ photons having an energy of 59.5 keV was not useful because of large errors in the data for this measurement. However, the XCOM computer estimated linear attenuation coefficients as shown in the following table show that the ALT phantom made using the DS-218-18 foam material closely matched those of the ICRU 46 lung.

| Linear Attenuation Coefficient (cm$^{-1}$) From XCOM | | | | |
|---|---|---|---|---|
| | Energy | | | |
| Phantom | 17.2 keV | 20.2 keV | 59.5 keV | 661 keV |
| ICRU 46 lung | 0.312 | 0.211 | 0.054 | 0.0855 |
| ALT Phantom | 0.309 | 0.211 | 0.055 | 0.0834 |

EXAMPLE 2

An experiment was conducted to compare the ALT phantom made according to the specifications of the present invention to a standard and to Griffith et al. The comparison is based upon chemical composition and linear attenuation coefficient which is calculated from mass attenuation coefficient and density. Mass attenuation coefficient is obtained from chemical composition including all trace elements that are input into the XCOM computer code. The following table contains pertinent chemical make-up input parameters for each phantom candidate.

| Phantom Chemical Composition Parameters Input to XCOM (Per Cent by Weight) | | |
|---|---|---|
| Chemical | ICRU 46 lung | ALT Phantom |
| Hydrogen | 10.3 | 8.12 |
| Carbon | 10.5 | 60.72 |
| Nitrogen | 3.1 | 2.95 |
| Oxygen | 79.4 | 25.41 |
| Sodium | 0.2 | — |
| Phosphorus | 0.2 | 0.31 |
| Sulfur | 0.3 | — |
| Chlorine | 0.3 | 0.82 |
| Potassium | 0.2 | — |
| Calcium | — | 1.60 |
| Iron | — | 0.002 |
| Tin | — | 0.010 |

Chemical composition data are unavailable for Griffith et al.

Corresponding attenuation coefficients were obtained from the XCOM computer code for several radiation energies as given in the following table.

| Linear Attenuation Coefficient (cm$^{-1}$) From XCOM | | | | |
|---|---|---|---|---|
| | Energy | | | |
| Phantom | 17.2 keV | 20.2 keV | 59.5 keV | 661 keV |
| ICRU 46 lung | 0.312 | 0.211 | 0.054 | 0.0855 |
| ALT Phantom | 0.309 | 0.211 | 0.055 | 0.0834 |

The reason that data are unavailable for Griffith et al. is that the chemical make-up required for XCOM for the Griffith et al. lung phantom is unknown. However, as reported herein in the Background, the 17.2 keV linear attenuation coefficient of the Griffith et al. lung phantom is 0.272 cm$^{-1}$.

Hence, the ALT phantom is seen to exhibit an attenuation coefficient that is surprisingly close to the standard ICRU lung. This is surprising because the ALT phantom has a chemical composition very different from the ICRU 46 lung. Further, the ALT phantom has a density of (0.26 g/cm$^3$) that is less than the density (0.28 g/cm$^3$) of the Griffith et al. phantom and, all else being equal, a lower density would be expected to exhibit a lower attenuation coefficient. Surprisingly, the ALT phantom exhibits a higher 17 keV linear attenuation coefficient (0.309 cm$^{-1}$) than the Griffith et al. phantom (0.272 cm$^{-1}$), yet one that closely matches the ICRU 46 lung.

ALTERNATIVE EMBODIMENTS

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A lung phantom for simulating radionuclide response of real lungs, comprising:
   (a) a two-part polyurethane having a first part of 4-4-diphenylmethane-diisocyanate and a second part of polyol wherein the relative proportion of the first and second parts is about 50 weight percent;
   (b) calcium carbonate for radiation attenuation,
   (c) lanthanum nitrate as a radionuclide carrier, and
   (d) acetone for mixing the lanthanum nitrate into the polyurethane,
   (e) whereby said lung phantom is an isocyanate polyurethane foam exhibiting linear attenuation coefficients closely matching a standard ICRU 46 lung.

2. A lung phantom as recited in claim 1, wherein said two part polyurethane has a nominal density of about 18 lb/ft$^3$ (0.288 g/cm$^3$).

3. A lung phantom as recited in claim 1, further comprising potassium carbonate as a source of potassium-40 background.

4. A lung phantom as recited in claim 3, wherein said two part polyurethane has a nominal density of about 18 lb/ft$^3$ (0.288 g/cm$^3$).

5. A lung phantom as recited in claim 3, wherein
   (a) said first part is present in a total proportion by weight of from about 46.34 weight percent to about 48.24 weight percent, and said second part is present in a total proportion by weight of from about 46.34 weight percent to about 48.24 weight percent;

(b) said calcium carbonate is present in a total proportion of from about 3.9 weight percent to about 4.1 weight percent;
(c) said lanthanum nitrate is present in a total proportion of from about 0.001 weight percent to about 0.004 weight percent;
(d) said acetone is present in a total proportion of from about 0.8 weight percent to about 1.8 weight percent; and
(e) said potassium carbonate is present in a total proportion less than about 0.02 weight percent.

6. A lung phantom as recited in claim 5, wherein a left lung has a weight of about 482 g and a right lung has a weight of about 577 g.

7. A lung phantom as recited in claim 1, wherein
(a) said first part is present in a total proportion by weight of from about 46.34 weight percent to about 48.24 weight percent, and said second part is present in a total proportion by weight of from about 46.34 weight percent to about 48.24 weight percent;
(b) said calcium carbonate is present in a total proportion of from about 3.9 weight percent to about 4.1 weight percent;
(c) said lanthanum nitrate is present in a total proportion of from about 0.001 weight percent to about 0.004 weight percent; and
(d) said acetone is present in a total proportion of from about 0.8 weight percent to about 1.8 weight percent.

8. A lung phantom as recited in claim 7, wherein a left lung has a weight of about 482 g and a right lung has a weight of about 577 g.

9. A method of making a lung phantom for simulating radionuclide response of real lungs, comprising:
(a) obtaining a two-part polyurethane having a first part of 4-4-diphenylmethane-diisocyanate and a second part of polyol wherein the first and second parts are present in a relative proportion of about 50 percent by weight;
(b) mixing calcium carbonate for radiation attenuation with said second part;
(c) mixing lanthanum nitrate as a radionuclide carrier in acetone;
(d) cooling the mixture of step (b), the mixture of step (c), and said second part to a temperature effective to inhibit a foaming reaction; and
(e) combining the cooled mixtures of step (d) and pouring the combination into a preheated mold;
(f) whereby said phantom exhibits attenuation coefficients closely matching a standard ICRU 46 lung.

10. A method as recited in claim 9, wherein said temperature effective to inhibit a foaming reaction is from about just above a freezing temperature of the mixture of step (b) to about 60° F.

11. A method as recited in claim 9, further comprising the step of adding potassium carbonate as a source of potassium-40 background.

12. A method as recited in claim 11, wherein
(a) said first part is present in a total proportion by weight of from about 46.34 weight percent to about 48.24 weight percent, and said second part is present in a total proportion by weight of from about 46.34 weight percent to about 48.24 weight percent;
(b) said calcium carbonate is present in a total proportion of from about 3.9 weight percent to about 4.1 weight percent;
(c) said lanthanum nitrate is present in a total proportion of from about 0.001 weight percent to about 0.004 weight percent;
(d) said acetone is present in a total proportion of from about 0.8 weight percent to about 1.8 weight percent; and
(e) said potassium carbonate is present in a total proportion less than about 0.02 weight percent.

13. A method as recited in claim 9, wherein combining is performed over a period of about 5 minutes.

14. A method as recited in claim 9, wherein said mold is preheated to a temperature from about 100° F. to about 120° F.

15. A method as recited in claim 9, wherein
(a) said first part is present in a total proportion by weight of from about 46.34 weight percent to about 48.24 weight percent, and said second part is present in a total proportion by weight of from about 46.34 weight percent to about 48.24 weight percent;
(b) said calcium carbonate is present in a total proportion of from about 3.9 weight percent to about 4.1 weight percent;
(c) said lanthanum nitrate is present in a total proportion of from about 0.001 weight percent to about 0.004 weight percent; and
(d) said acetone is present in a total proportion of from about 0.8 weight percent to about 1.8 weight percent.

16. A method as recited in claim 9, wherein mixing calcium carbonate with said second part comprises the steps of:
(a) mixing said second part with said calcium carbonate in a relative proportion by weight from about 5:1 to about 6:1;
(b) sifting said calcium carbonate through a screen into said second part;
(c) milling said second part with said sifted calcium carbonate in a two-roll mill into a concentrate;
d) adding additional second part to said concentrate to obtain a relative proportion by weight of second part to calcium carbonate of about 11.8:1.

* * * * *